US008275502B2

(12) United States Patent
O'Connor et al.

(10) Patent No.: US 8,275,502 B2
(45) Date of Patent: Sep. 25, 2012

(54) BRAKING REGENERATION ENERGY SHUNT SYSTEM

(75) Inventors: Sean C. O'Connor, Charlotte, NC (US); Kenneth R. Wilson, Stanley, NC (US); Jeffrey A. Millard, Fort Mill, SC (US)

(73) Assignee: Textron Innovations Inc., Providence, RI (US)

( * ) Notice: Subject to any disclaimer, the term of this patent is extended or adjusted under 35 U.S.C. 154(b) by 780 days.

(21) Appl. No.: 12/360,497

(22) Filed: Jan. 27, 2009

(65) Prior Publication Data

US 2009/0192661 A1 Jul. 30, 2009

Related U.S. Application Data

(60) Provisional application No. 61/024,068, filed on Jan. 28, 2008.

(51) Int. Cl.
*B60L 9/00* (2006.01)
(52) U.S. Cl. ......................................................... 701/22
(58) Field of Classification Search .................... 701/22, 701/90, 64
See application file for complete search history.

(56) References Cited

U.S. PATENT DOCUMENTS

| | | | | |
|---|---|---|---|---|
| 5,153,496 A | * | 10/1992 | LaForge | 320/119 |
| 5,656,915 A | * | 8/1997 | Eaves | 320/118 |
| 6,242,873 B1 | * | 6/2001 | Drozdz et al. | 318/139 |
| 7,324,902 B2 | * | 1/2008 | Verbrugge et al. | 702/64 |
| 7,610,975 B1 | * | 11/2009 | Gust et al. | 180/65.245 |
| 2002/0196027 A1 | * | 12/2002 | Tate et al. | 324/430 |
| 2005/0242776 A1 | * | 11/2005 | Emori et al. | 320/116 |
| 2006/0046895 A1 | * | 3/2006 | Thacher et al. | 477/4 |
| 2006/0192533 A1 | * | 8/2006 | Kimura et al. | 322/22 |
| 2007/0188137 A1 | * | 8/2007 | Scheucher | 320/116 |
| 2008/0050645 A1 | * | 2/2008 | Kai et al. | 429/61 |
| 2008/0284375 A1 | * | 11/2008 | Nagaoka et al. | 320/116 |
| 2009/0091332 A1 | * | 4/2009 | Emori et al. | 324/537 |

* cited by examiner

*Primary Examiner* — James Trammell
*Assistant Examiner* — Truc M Do
(74) *Attorney, Agent, or Firm* — Harness, Dickey & Pierce, P.L.C.

(57) ABSTRACT

A regeneration energy shunt system utilizes a module to monitor the power bus voltage and can divert excess regeneration energy to a resistor array to dissipate the excess regeneration energy. The module can monitor the state of charge of a rechargeable power source to ascertain when excess regeneration energy condition exists. The resistor array can include a plurality of resistors. The module can ascertain the number of resistors needed dissipate the excess regeneration energy and selectively direct the excess regeneration energy to the required number of resistors. The module can dynamically switch which resistors are used to dissipate the excess regeneration energy and can thereby even out the loading across the resistors. The module can ascertain a state of health of the individual resistors and remove unhealthy resistors from service, report the state of health of the resistors, and initiate changes in operation based thereon.

29 Claims, 8 Drawing Sheets

BRAKING REGENERATION ENERGY SHUNT SYSTEM

CROSS-REFERENCE TO RELATED APPLICATIONS

This application claims the benefit of U.S. Provisional Application No. 61/024,068, filed on Jan. 28, 2008. The entire disclosure of the above application is incorporated herein by reference.

FIELD

The present disclosure relates to turf maintenance vehicles and, more particular, to a braking regeneration energy shunt system for a hybrid electric turf maintenance vehicle.

BACKGROUND

The statements in this section merely provide background information related to the present disclosure and may not constitute prior art.

Turf maintenance vehicles, utility vehicles and aerator vehicles (collectively referred to herein as "turf maintenance vehicles") are commonly used to maintain turf surfaces. These turf maintenance vehicles can be used to cut rough grass, fairway grass or lawns, and more precisely maintain grass height of golf course greens. At least one wheel is normally powered by a power unit. Some turf maintenance vehicles can be hybrid electric turf maintenance vehicles. The hybrid electric turf maintenance vehicles can be powered with a gas or diesel engine coupled to a generator and/or an alternator (hereinafter a Genset). Some hybrid electric turf maintenance vehicles are powered with a fuel cell. The hybrid electric turf maintenance vehicle uses a rechargeable power source, such as a buffer battery pack, to give power assist to the traction system under short-duration, high-demand traction loading. Other types of electric turf maintenance vehicles are only powered by a rechargeable power source, such as a battery pack, which is sized to provide the necessary electrical power to operate the turf maintenance vehicle. Regenerative energy can be created during braking or deceleration of the turf maintenance vehicle. This regeneration energy can be utilized to charge the rechargeable power source.

In the case of a hybrid electric turf maintenance vehicle, the rechargeable power source is typically at a 100% state of charge (SOC) for most of the duty cycle of the turf maintenance vehicle. The regeneration energy created can exceed the amount needed to recharge the rechargeable power source and, if directed into the rechargeable power source, can overcharge the rechargeable power source and reduce the useful life and/or cause failure. In the case of an all-electric turf maintenance vehicle that is only powered by the rechargeable power source, the regeneration energy created can also exceed the amount needed to recharge the rechargeable power source and, if directed into the rechargeable power source, can overcharge the rechargeable power source and reduce the useful life and/or cause failure. This excess regeneration energy, therefore, must be burned off or otherwise dissipated to avoid overcharging the rechargeable power source.

SUMMARY

According to several embodiments of the present disclosure, a regeneration energy shunt system utilizes a module that can monitor the power bus voltage and diverts excess regeneration energy to at least one resistor and/or resistor array to dissipate the excess regeneration energy. The module can monitor the state of charge of a rechargeable power source to ascertain when excess regeneration energy condition exists. The resistor array can include a plurality of resistors. The module can ascertain the number of resistors needed to dissipate the excess regeneration energy and selectively direct the excess regeneration energy to the required number of resistors. The module can dynamically switch which resistors are used to dissipate the excess regeneration energy and can thereby distribute the loading across the resistors. The module can ascertain a state of health of the individual resistors and remove unhealthy resistors from service, report the state of health of the resistors, and initiate changes in operation based thereon.

According to several embodiments of the present disclosure, a braking regeneration energy shunt system for a turf maintenance vehicle includes a power bus and a traction motor coupled to the power bus. The traction motor develops back electromotive force that can be directed into the power bus as regeneration energy. A rechargeable power source is coupled to the power bus and can selectively provide electric current to the power bus and can selectively receive electric current from the power bus. A resistor array having a plurality of resistors can selectively dissipate regeneration energy into heat. A control module monitors at least one of a voltage of the power bus and a state of charge of the rechargeable power source. The control module selectively directs regeneration energy created by the traction motor into the resistor array for dissipation as heat based on at least one of the voltage of the power bus and the state of charge of the rechargeable power source.

According to some embodiments, the control module can ascertain a state of health of the resistors and selectively direct the regeneration energy only to one or more of the resistors that are ascertained as healthy. The control module can determine an impedance of the resistors and ascertain the state of health of the resistors based on the impedance. The control module can signal when the state of health of a resistor is below a predetermined value. The resistor array can include a temperature sensor that sends a signal to the control module indicative of a temperature of the resistor array and the control module can monitor the temperature of the resistor array.

According to some embodiments, the control module ascertains the number of resistors needed to dissipate the regeneration energy directed to the resistor array and directs the regeneration energy simultaneously to the ascertained number of resistors. The control module can ascertain the number of resistors needed based on the voltage of the power bus. The control module can increase the number of resistors simultaneously being directed the regeneration energy as the voltage of the power bus increases. The control module can compare the voltage of the power bus to a plurality of predetermined values and change the number of resistors simultaneously being directed the regeneration energy based on the comparison. When the ascertained number of resistors is less than a total number of resistors, the control module can distribute the load over all of the resistors by actively switching which resistors are directed the regeneration energy as the regeneration energy is being dissipated.

In some embodiments, the control module monitors both the voltage of the power bus and the state of charge of the rechargeable power source. The control module selectively directs the regeneration energy into the resistor array based on both the voltage of the power bus and the state of charge of the rechargeable power source.

In some embodiments, when the rechargeable power source is fully charged, the control module directs the regeneration energy to the resistor array.

According to several embodiments, a turf maintenance vehicle includes a rechargeable power source, a power bus coupled to the rechargeable power source and receives electrical energy therefrom. There is at least one driven wheel and at least one electric motor coupled to the power bus and operable to drive the at least one driven wheel. The at least one electric motor can create regeneration energy during deceleration, which can at least partially recharge the rechargeable power source. A resistor array having a plurality of resistors can selectively dissipate regeneration energy directed thereto into heat. A control module monitors at least one of a voltage of the power bus and a state of charge of the rechargeable power source. The control module selectively directs the regeneration energy created by the at least one motor into the resistor array for dissipation as heat based on at least one of the voltage of the power bus and the state of charge of the rechargeable power source.

According to several embodiments, the control module of the turf maintenance vehicle monitors both the voltage of the power bus and the state of charge of the rechargeable power source. The control module selectively directs the regeneration energy into the resistor array based on both the voltage of the power bus and the state of charge of the rechargeable power source.

According to some embodiments, the turf maintenance vehicle includes an engine and a generator operable to supply electrical power to the power bus. The engine and the generator are a primary source of electrical power supplied to the power bus. The rechargeable power source selectively supplements the primary source of electrical power during high-load conditions.

According to further embodiments, a method of dissipating regeneration energy created in a turf maintenance vehicle having a power bus, a rechargeable power source, and a resistor array having a plurality of resistors according the present teachings includes: (1) monitoring a voltage of the power bus; (2) monitoring a state of charge of the rechargeable power source; (3) creating regeneration energy during deceleration of the turf maintenance vehicle; (4) selectively routing the regeneration energy to the rechargeable power source when the state of charge is less than a predetermined value; (5) selectively routing the regeneration energy to the resistor array when the state of charge is greater than the predetermined value; and (6) dissipating the regeneration energy with at least two of the resistors in the resistor array when the regeneration energy is routed to the resistor array.

In some embodiments, the method can further include ascertaining a state of health of the resistors in the resistor array and the dissipating of the regeneration energy can include dissipating the regeneration energy with only resistors ascertained as being healthy. The method can include monitoring an impedance of each of the resistors and ascertaining the state of health of the resistors by comparing the impedance of the resistors to a predetermined standard. The method can also include signaling when the state of health of a resistor is below a predetermined value.

In some embodiments, the method can include ascertaining how many of the resistors are needed to be operated simultaneously to dissipate the regeneration energy and dissipating the regeneration energy with the ascertained number of resistors. Ascertaining the number of resistors needed to be operated simultaneously can be based on the voltage of the power bus. The voltage of the power bus can be compared to a plurality of predetermined values and the number of resistors simultaneously dissipating the regeneration energy can be changed based on the comparison. The simultaneous dissipating of the regeneration energy can include dynamically switching which resistors are dissipating the regeneration energy thereby distributing the load over more than the ascertained number of resistors. Dynamically switching can include switching through all of the resistors in the array, thereby distributing the load over all of the resistors in the array.

In some embodiments, the method can include selectively routing the regeneration energy to the resistor array when the rechargeable power source is fully charged.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. As used herein, the term module refers to an application specific integrated circuit (ASIC), an electronic circuit, a processor (shared, dedicated, or group) and memory that can execute one or more software or firmware programs, a combinational logic circuit, and/or other suitable components that provide the described functionality.

Figure 1:
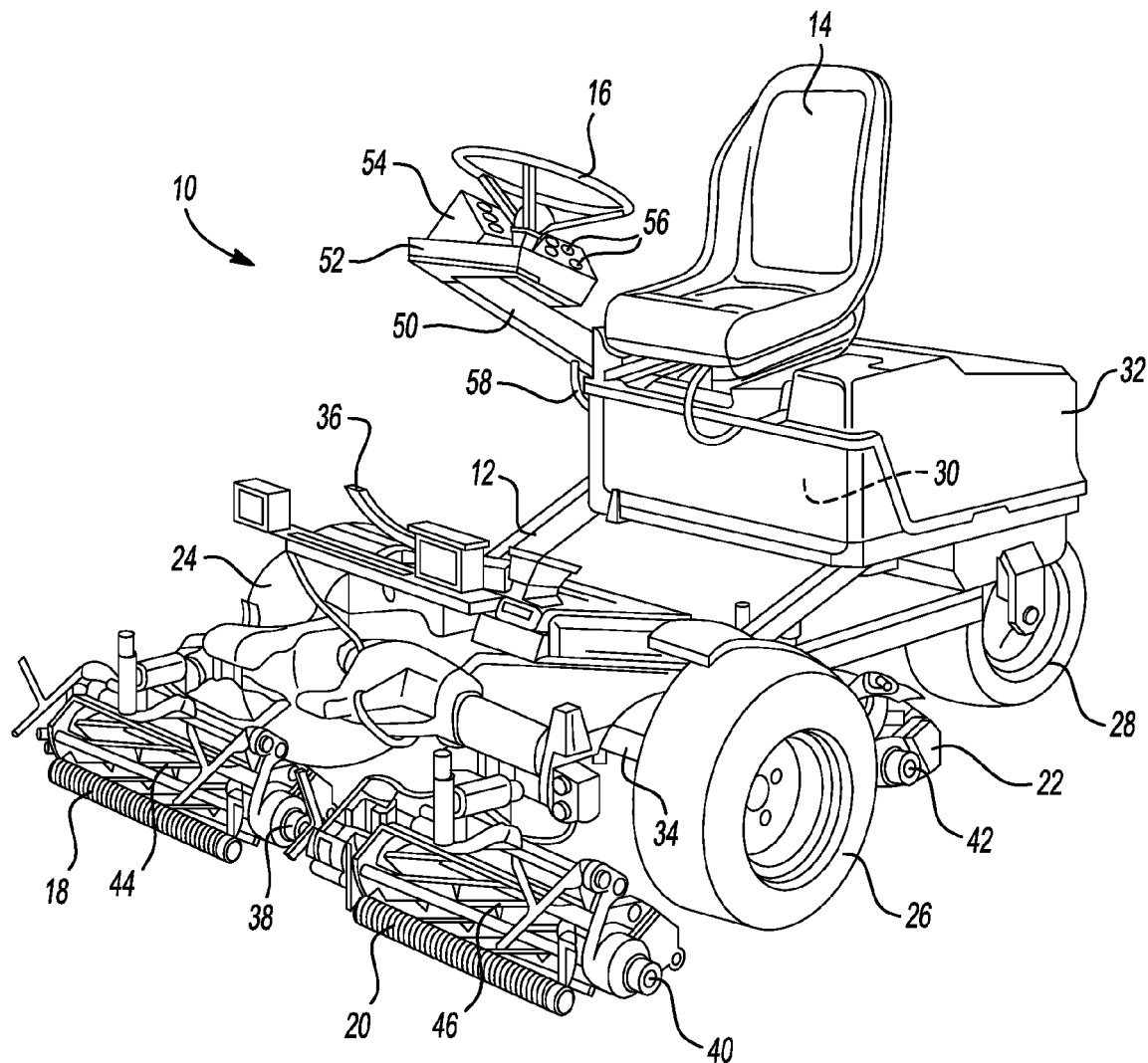
FIG. 1 is a perspective view of an exemplary hybrid electric turf maintenance vehicle which can utilize a regeneration energy shut system according to the present teachings.
Figure 2:
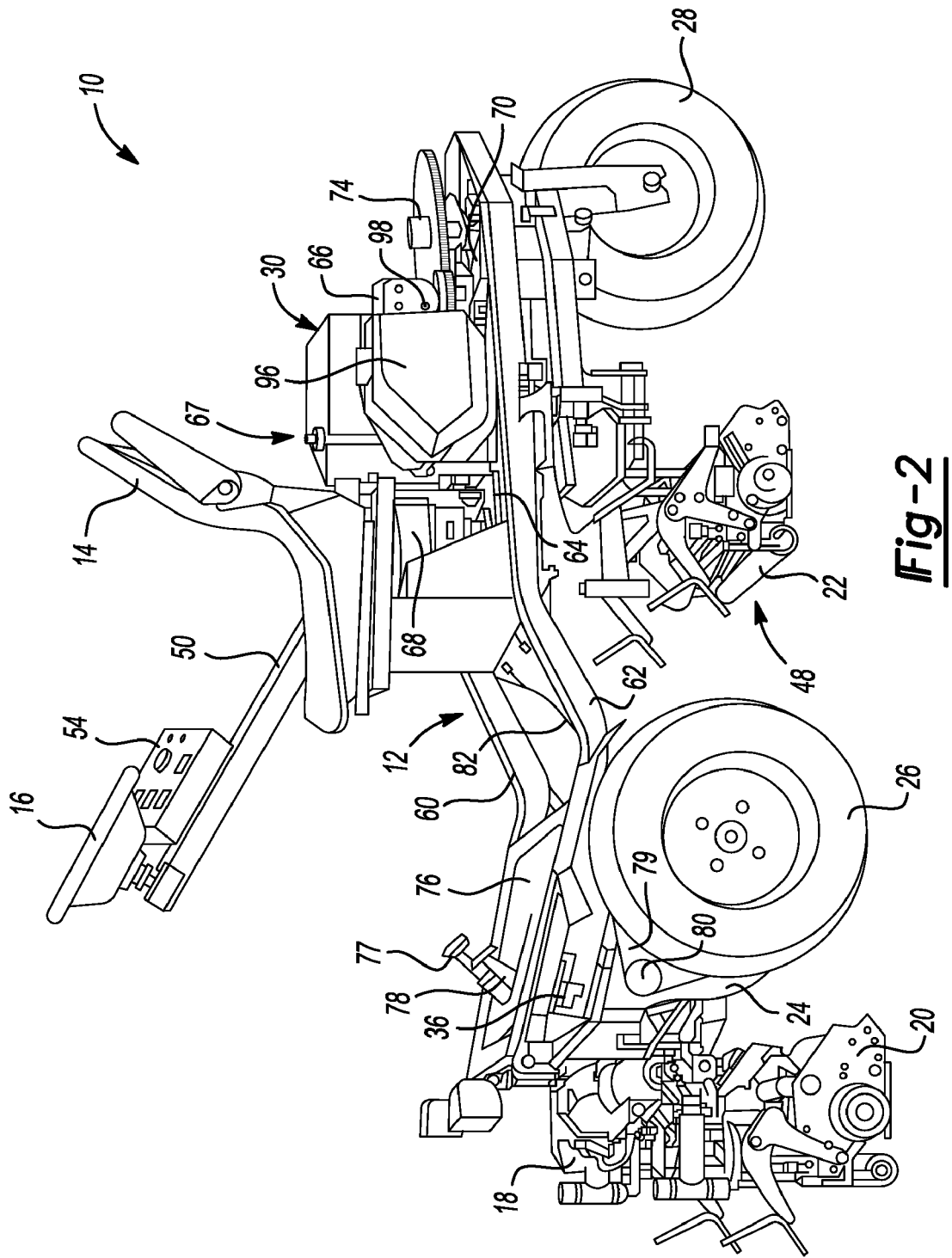
FIG. 2 is a side perspective view of the turf maintenance vehicle of FIG. 1 with a power unit cover removed for clarity.
Figure 3:
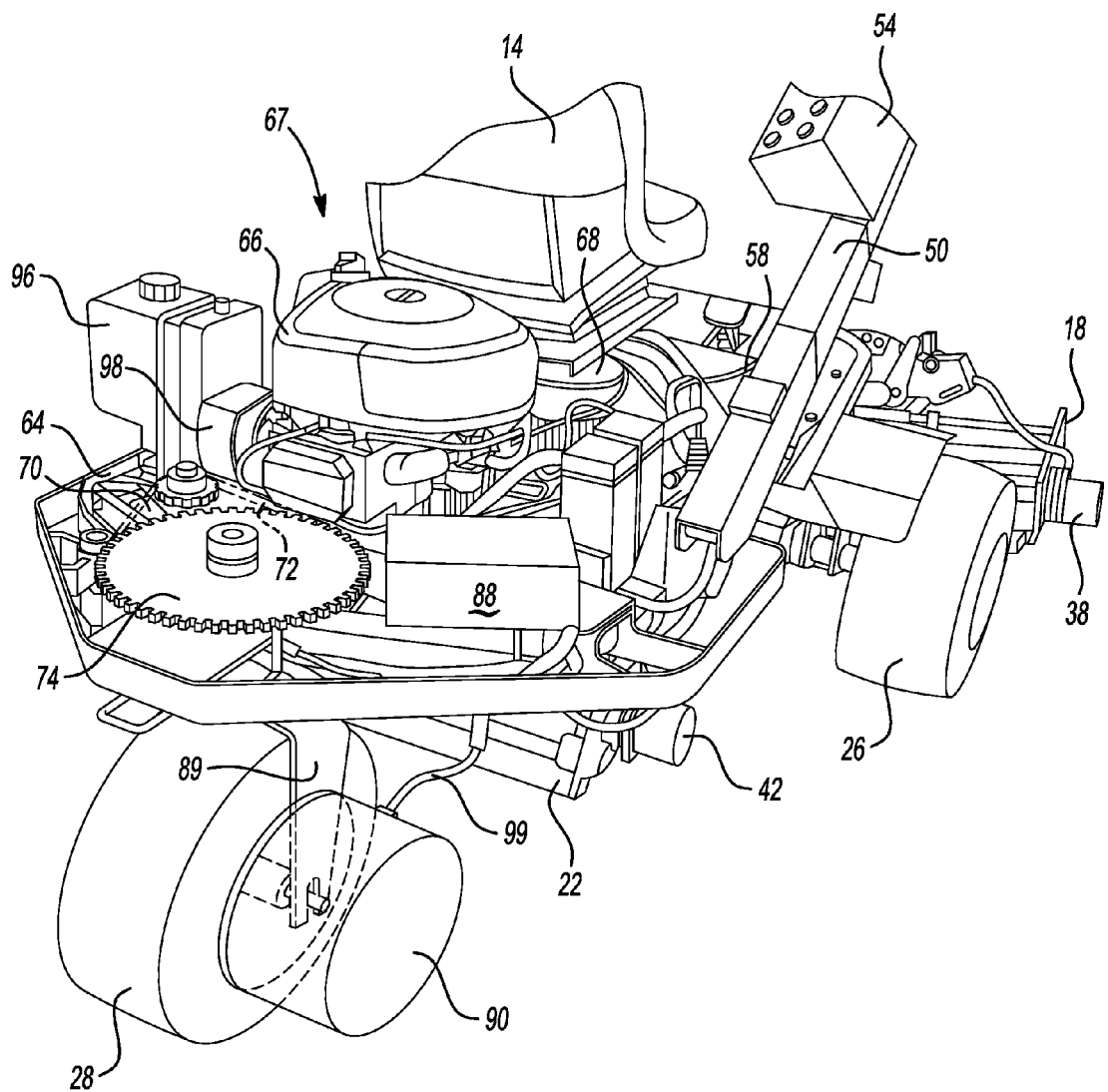
FIG. 3 is a fragmented rear perspective view of the turf maintenance vehicle of FIG. 1 showing a motor/generator power unit installed together.
Figure 4:
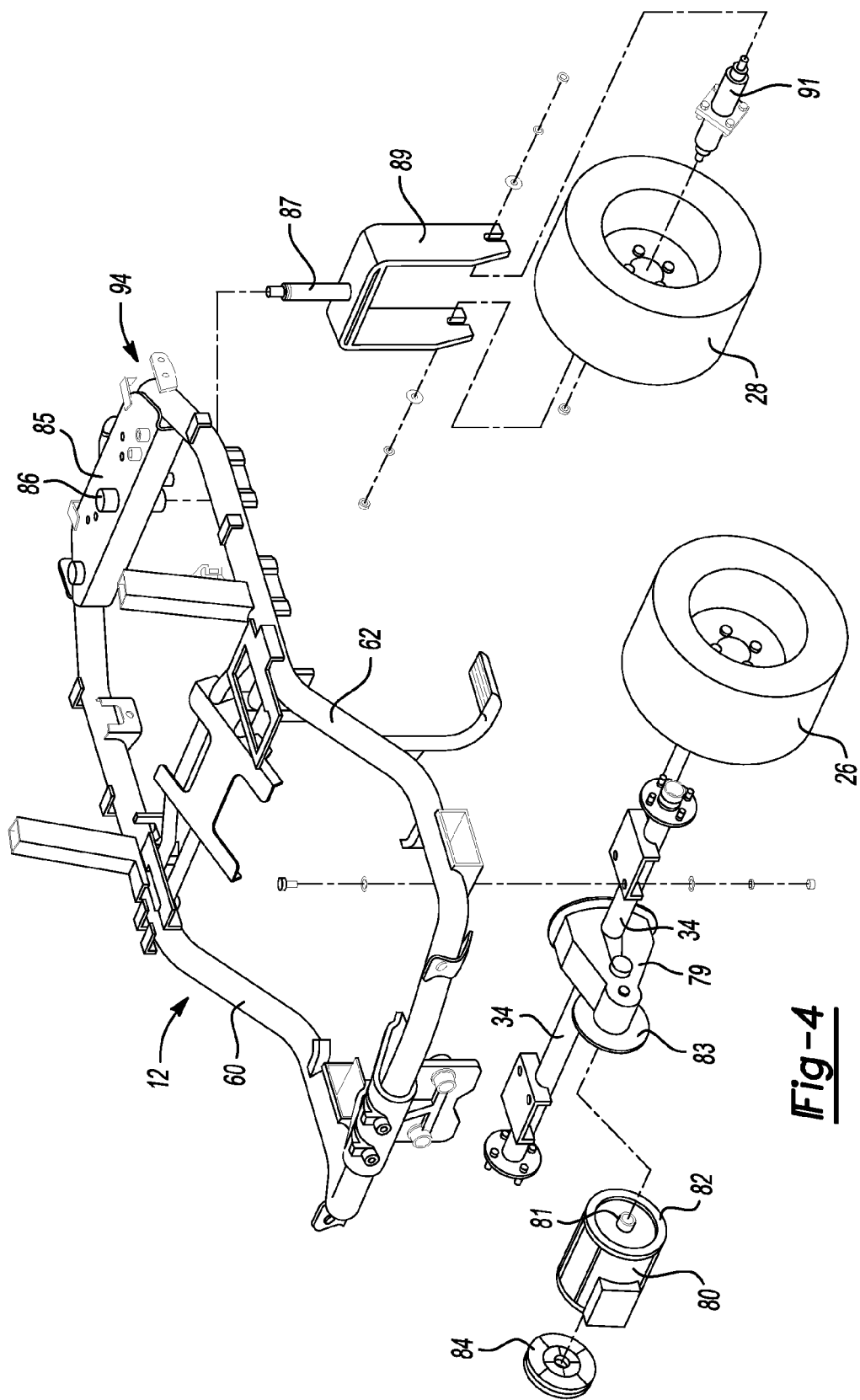
FIG. 4 is a partial assembly view of the frame and front drive system of the turf maintenance vehicle of FIG. 1.
Figure 5:
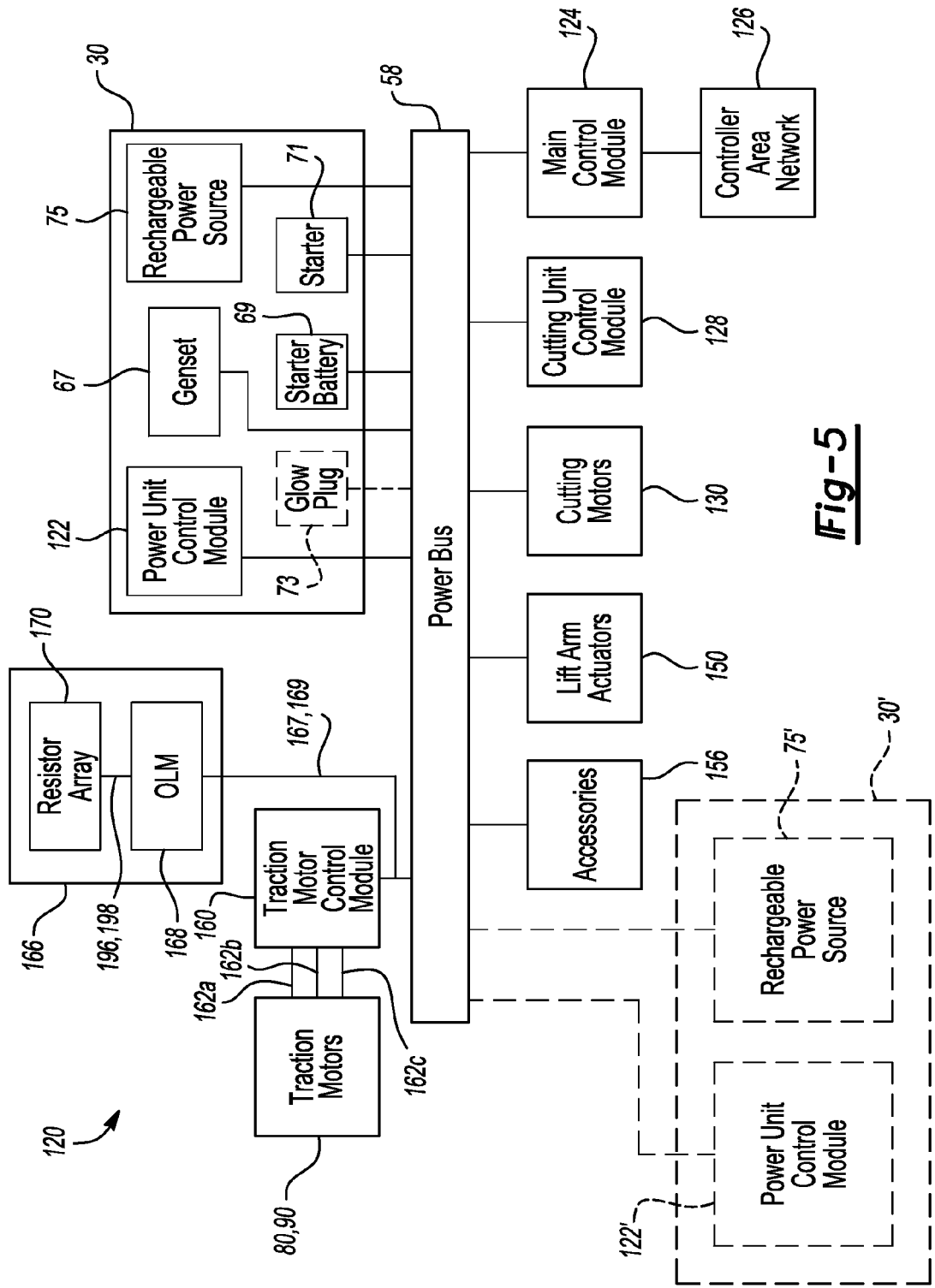
FIG. 5 is a simplified schematic representation of the electrical system of the turf maintenance vehicle of FIG. 1 with a regeneration energy shunt system according to the present teachings.
Figure 6:
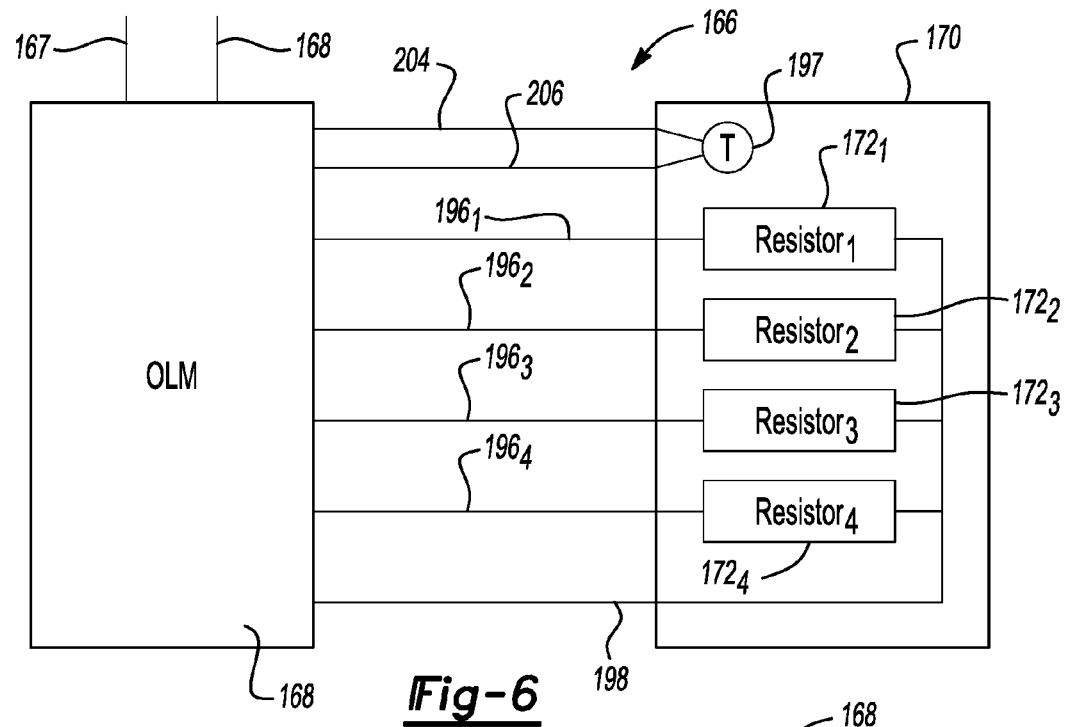
FIG. 6 is a simplified schematic representation of the overvoltage limiter module and the resistor array of the regeneration energy shunt system according to the present teachings.

Referring to FIGS. 1-4, an exemplary turf maintenance vehicle 10 that utilizes a regeneration energy shunt system according to the present teachings is shown. In some embodiments, as shown in FIGS. 1-5, turf maintenance vehicle 10 is a hybrid electric turf maintenance vehicle. In other embodiments, as shown in FIGS. 5 (phantom) and 10, turf maintenance vehicle 10 is an electric turf maintenance vehicle. Turf maintenance vehicle 10 includes a frame 12 supporting a seat 14 operable to support an operator, a steering device 16 such as a steering wheel, and a plurality of cutting units 18, 20, 22 supported by frame 12. Cutting units 18, 20, 22 are shown as reel blade units, however the cutting units can be other types including rotary cutting units, or may be any type of implements operated during turf care operations, including, cutting units, rakes, groomers, and the like by way of non-limiting example. Primary, or first and second drive wheels 24, 26 used to propel turf maintenance vehicle 10 are connected to frame 12. Secondary or steerable wheel 28 which can steer turf maintenance vehicle 10 is also connected to frame 12. In some turf maintenance vehicles, including the exemplary turf maintenance vehicle 10 shown herein, steerable wheel 28 can also be used to propel the turf maintenance vehicle thereby providing all-wheel drive. A power unit 30 is connected to frame 12 which can be provided with a cover 32. Power unit 30 provides electrical power to drive wheels 24, 26, 28. A throttle control device 36, which can be actuated by a foot controlled pedal is provided to control a forward or reverse speed or to stop turf maintenance vehicle 10.

Power unit 30 can be electrically coupled to each of a plurality of electric motors 38, 40, 42 each connected to one of the plurality of first, second and third cutting units 18, 20, 22. Electric motors 38, 40, 42 provide the rotating drive force to operate a plurality of first, second and third reel blade assemblies 44, 46, 48 rotatably mounted to individual ones of first, second and third cutting units 18, 20, 22. In additional embodiments, not shown, first, second and third cutting units 18, 20, 22 can be rotary blade cutting units, by way of non-limiting example.

A support arm 50 can be connected to frame 12 to provide a support member 52 for mounting steering device 16. Support member 52 can be adjustably supported from support arm 50 to allow operator adjustment of the position of steering device 16. A control unit 54 can be mounted on support arm 50 proximate to seat 14. Control unit 54 can provide a plurality of switches 56 to assist the operator in selecting operating parameters of turf maintenance vehicle 10 such as grass cutting height, reel blade assembly or rotary blade rotating speed, and operation of items such as lights. A power bus 58 distributes electrical power throughout turf maintenance vehicle 10 from power unit 30.

Frame 12 further includes a frame first member 60 and a frame second member 62. A power unit support member 64 is connectable between frame first and second members 60, 62. Power unit support member 64 supports power unit 30. In some embodiments, power unit 30 is a hybrid electric power unit and can include a reciprocating engine 66, such as a gasoline or diesel engine or rotary engine, by way of non-limiting example, and a generator 68. The combination engine and generator is also be referred to as a genset and indicated with indicia 67. Engine 66 provides rotating power to drive generator 68 to generate electrical power for turf maintenance vehicle 10. A starter battery 69 can provide a start-up voltage to a starter 71 (shown in FIG. 5) to start engine 66. When engine 66 is a diesel engine, power unit 30 can include a glow plug 73 (shown in FIG. 5). Power unit 30 also includes a rechargeable power source 75 (shown in FIG. 5) that can give an electrical power assist to turf maintenance vehicle 10 under short-duration, high-demand conditions, as described below. Rechargeable power source 75 can be a buffer battery pack. For the embodiment shown having reciprocating engine 66 and generator 68 for power unit 30, reciprocating engine 66 is supplied with fuel from a fuel tank 96 supported by power unit support member 64 and with filtered air via an air filter 98.

In other embodiments, as shown in FIGS. 5 (phantom) and 10, power unit 30' can be a rechargeable power source that provides all of the electrical power to turf maintenance vehicle 10. Power unit 30' can be configured as a battery unit having a plurality of batteries 57, each producing a DC voltage and current. Batteries 57 are collectively supported on a frame 59 which is dimensionally equivalent to power unit support member 64. In various embodiments, each of the batteries 57 are electrically coupled in series/parallel configuration, or various alternative configurations thereof, and jointly connected to power bus 58.

Power units 30, 30', according to several embodiments, can provide an output voltage of approximately 48 volts DC to power bus 58. It should be appreciated, however, that other output voltages can be utilized.

A drive unit 70 can be separately supported from power unit support member 64, and receives electrical power from power bus 58. In some embodiments drive unit 70 is an electric steering motor which is electrically connectable to steering device 16 and rotates steerable wheel 28 in response to a specific rotation angle of steering device 16. A chain 72 driven by drive unit 70 can also be used to rotate a gear assembly 74 to rotate steerable wheel 28 when drive unit 70 receives electrical steering signals from steering device 16. Drive unit 70 and gear assembly 74 can be separately supported to frame 12 from first power unit support member 64 to allow maintenance of the components of power unit 30 without removal of drive unit 70 or gear assembly 74.

In other embodiments, drive unit 70 can be replaced with a mechanical or linkage drive system (not shown). Determination of the specific rotation angle of steering device 16 can still be obtained from an electric signal generated by one or more sensors connected to the mechanical or linkage drive system. The mechanical or linkage drive system is connected to steerable wheel 28 in these embodiments. Gear assembly 74 can be eliminated in these embodiments unless it is desirable to provide increased operating torque to turn steerable wheel 28.

Turf maintenance vehicle 10 can also include a foot support structure 76, which supports throttle control device 36 having in several embodiments an accelerator pedal 77 and a brake pedal 78 acting as a brake and/or parking brake pedal. A differential 79 is coupled to axle shaft 34 to rotatably drive first and second drive wheels 24, 26. An electric motor 80, such as a traction motor, is coupled to differential 79. Rotation of a shaft 81 of electric motor 80 provides the drive input to differential 79. Motor 80 includes a mounting flange 82 adapted to fastenably engage with a receiving flange 83 of differential 79. An electrically controlled brake 84 can be provided for motor 80 to provide a positive breaking force to prevent rotation of a splined shaft 81 of first motor 80.

A rear frame section 94 is connected to frame first and second members 60, 62 of frame 12 and can include a support plate 85 having a bearing sleeve 86 provided to rotatably receive a shaft 87 fixedly connected to a yoke 89. Shaft 87 is disposed within bearing sleeve 86 allowing rotation of yoke 89. An axle assembly 91 is fastened to steerable wheel 28 and mounted to distal ends of yoke 89.

Support arm 50 can be fixedly or rotatably supported to frame 12. A power steering control unit 88 is electrically connected between steering device 16 and drive unit 70. Power steering control unit 88 receives electrical control signals from steering device 16 and converts these signals to displacement signals operable to rotate a shaft of drive unit 70 either counterclockwise or clockwise to rotate yoke 89 connected to steerable wheel 28. An electric motor 90, such as a traction motor, is supported from yoke 89 and is rotatably coupled to steerable wheel 28. Traction motor 90 receives power from power bus 58. Rotation of steerable wheel 28 by drive unit 70 is either mechanically or electrically limited to prevent damage to electrical wiring 99.

Power unit 30, 30' provides electrical power to power bus 58 which supplies electrical power to the various electrically operated components of turf maintenance vehicle 10. Referring to FIG. 5, a simplified schematic of an electrical system 120 of turf maintenance vehicle 10 is shown. Electrical system 120 includes power bus 58. In the embodiments using power unit 30, the various electrically operated components of power unit 30 are coupled to power bus 58. For example, the power output of genset 67 is coupled to power bus 58 to supply electrical power to power bus 58. Rechargeable power source 75 is coupled to power bus 58 and can supply power thereto to give power assist under short duration, high-demand traction loading conditions. Rechargeable power source 75 can also receive power from power bus 58 to recharge. For example, during braking or deceleration, regeneration energy created by traction motors 80, 90 can be directed to rechargeable power source 75 for recharging, as described below. Starter battery 69, starter 71 and glow plug 73, if so equipped, are also electrically connected to power bus 58 and can receive electrical power therefrom.

A power unit control module 122 is electrically connected to power bus 58 and receives electrical power therefrom. Power unit control module 122 can monitor the operation of genset 67 and control operation of genset 67, rechargeable power source 75 and the other components of power unit 30 to meet a desired operation.

In the embodiments using power unit 30', the various electrically operated components of power unit 30' are coupled to power bus 58. For example, rechargeable power source 75' is coupled to power bus 58 and can supply power thereto to meet the electrical demands of turf maintenance vehicle 10. Rechargeable power source 75' can also receive power from power bus 58 to recharge. For example, during braking or deceleration, regeneration energy created by traction motors 80, 90 can be directed to rechargeable power source 75' for recharging, as described below. A power unit control module 122' is electrically connected to power bus 58 and receives electrical power therefrom. Power unit control module 122' can monitor the state of charge of rechargeable power source 75'.

A main control module 124 is electrically connected to power bus 58 and can receive electrical power therefrom. Main control module 124 can control and coordinate the operation of the various components and modules utilized in turf maintenance vehicle 10. Main control module 124 can be a single, stand alone control module or can include one or more of the other modules utilized in turf maintenance vehicle 10. Main control module 124 can communicate with the other modules through a controller area network 126.

A cutting unit control module 128 is electrically connected to power bus 58 and receives electrical power therefrom. Cutting unit control module 128 can command operation of cutting units 18, 20, 22 as desired. For example, cutting unit control module 128 can command operation of the various electric motors 38, 40, 42 which receive electrical power from power bus 58 and which are collectively illustrated in FIG. 5 with reference indicia 130. Additionally, cutting unit control module 128 can also command desired operation of the lift arm actuators 150 which also receive electrical power from power bus 58. Lift arm actuators can move the associated cutting units 18, 20, 22 between operating and transport positions, by way of non-limiting example.

Electrical system 120 also includes a variety of other accessories, components and/or modules, collectively indicated with reference indicia 156 which receive electrical power from power bus 58. These other accessories, components and/or modules 156 can include such things as lights, speakers, switches, actuators, components of steering device 16, throttle control device 36, control unit 54, accelerator pedal 77, brake pedal 78, display modules, and the like by way of non-limiting example. It should be appreciated that other accessories, components and/or modules can be utilized in turf maintenance vehicle 10 and receive electrical power from power bus 58.

A traction motor control module 160 is electrically connected to power bus 58 and receives electrical power therefrom. Traction motor control module 160 is operable to convert the DC current from power bus 58 into three phase AC current which is supplied to traction motors 80, 90 via power lines 162a, 16b, 162c. Traction motor control module 160 is operable to command desired operation of traction motors 80, 90 to produce a desired movement of turf maintenance vehicle 10.

During operation of turf maintenance vehicle 10, traction motor control module 160 commands the operation of traction motors 80, 90 to produce the desired movement of turf maintenance vehicle 10 in response to operator input. During some operational conditions of turf maintenance vehicle 10 utilizing power unit 30, such as during high traction loading, the required electrical power may exceed the power output of genset 67. During these conditions, power unit control module 122 may command additional electrical power to be supplied to power bus 58 from rechargeable power source 75. Rechargeable power source 75 can thereby supplement the electrical power produced by genset 67.

During deceleration or braking of turf maintenance vehicle 10, traction motors 80, 90 can become generators and generate back electromotive force (EMF) which generates three phase electrical current. The electrical current created by the back EMF is directed into traction motor control module 160 via lines 162a, 162b, 162c. Traction motor control module 160 can convert the back EMF three phase AC current into DC current and direct the DC current into power bus 58. This back EMF is regeneration energy created during operation of turf maintenance vehicle 10. The regeneration energy can be directed to rechargeable power source 75, 75' for a recharging operation. The recharging of rechargeable power source 75, 75' can be controlled by power unit control module 122, 122'. During operation of turf maintenance vehicle 10 when utilizing power unit 30, however, the state of charge (SOC) of rechargeable power source 75 is at 100 percent for most of the duty cycle. When turf maintenance vehicle 10 utilizes power unit 30', the SOC of rechargeable power source 75' is typically only at 100 percent during the initial stages of operation of turf maintenance vehicle 10. When the SOC of rechargeable power source 75, 75' is at 100 percent, routing of regeneration energy thereto can result in overcharging rechargeable power source 75, 75' and, as a result, may reduce the operating life or cause failure of rechargeable power source 75, 75'. In some rechargeable power sources 75, 75', overcharging may not be of concern and checking or monitoring the SOC may not be needed.

To prevent overcharging rechargeable power source 75, 75', the SOC of rechargeable power source 75, 75' is monitored by power unit control module 122, 122' and can be shared with main control module 124, traction motor control module 160 or other modules through controller area network 126. The amount of regeneration energy in excess of that needed to recharge rechargeable power source 75, 75' is herein referred to as "excess regeneration energy." Excess regeneration energy therefore represents the amount of electrical energy that needs to be dissipated/consumed/discharged in a manner other than through recharging rechargeable power source 75, 75'.

A regeneration energy shunt system 166 according to the present teachings is utilized in electrical system 120 to dissipate the excess regeneration energy. Shunt system 166 can include an over-voltage limiter module (OLM) 168 and a resistor array 170. OLM 168 is electrically connected to traction motor control module 160 with power lines 167, 169. The connection of OLM 168 to traction motor control module 160 allows the regeneration energy from traction motor control module 160 to be selectively directed to OLM 168 instead of power bus 58. This connection thereby allows the regeneration energy to be directed to OLM 168 during periods of excess regeneration energy. OLM 168 can direct the excess regeneration energy to resistor array 170 wherein the excess regeneration energy is converted into and dissipated as heat through one or more resistors 172 of resistor array 170, as described below.

Referring now to FIGS. 5-9, details of an exemplary OLM 168 and an exemplary resistor array 170 are illustrated. Resistor array 170 includes one or more resistors 172 that are supported in a support frame 174. The exact number of resistors 172 can vary based on the needs of turf maintenance vehicle 10. In some embodiments, such as the illustrated embodiment, resistor array 170 can have four resistors $172_1$, $172_2$, $172_3$, $172_4$ that are supported in a support frame 174. In other embodiments (not shown) resistor array 170 can have less than or more than four resistors 172. Support frame 174 maintains resistors 172 is a spaced apart relation. Support frame 174 includes a bracket portion 176, side portions 178 and a ventilated shield portion 180. Side portions 178 include a plurality of complementary openings 182 through which a rod 184 can extend. Each resistor 172 includes a central channel 186 through which rod 184 can extend. Each resistor 172 is held in place between side portions 178 and supported by an associated rod 184. Rod 184 can be secured to support frame with a fastener 188. Bracket portion 176 includes a plurality of openings 190 that allow support frame 174 to be attached to turf maintenance vehicle 10. Resistors 172 are electrically isolated from support frame 174.

Each resistor 172 is operable to conduct an electrical current therethrough and convert the electrical current into heat which is dissipated into the environment. Resistors 172 are configured and sized to be able to dissipate the excess regeneration energy. Resistors of various properties, shapes, constructions, configurations and sizes can be utilized in resistor array 170. One suitable resistor is a rib wound resistor available from Milwaukee Resistor Corporation of Milwaukee, Wis., by way of non-limiting example. In the embodiment illustrated, each resistor 172 includes a ceramic tube 192 and a metal ribbon 194 wound around ceramic tube 192. Epoxy can hold metal ribbon 194 on ceramic tube 192. Resistors 172 can each have a resistance of 2 ohms and can support up to a 30 amp current and dissipate 300 watts of power, by way of non-limiting example. It should be appreciated that the resistors 172 illustrated are merely exemplary and that other resistors can be utilized in resistor array 170 and regeneration energy shunt system 166. Additionally, a single resistor with multiple resistive elements (independently operable or not) may be utilized in resistor array 170.

Each resistor $172_1$, $172_2$, $172_3$, $172_4$ is electrically connected to OLM 168 with an electrical line $196_1$, $196_2$, $196_3$, $196_4$, respectively. A common (ground) line 198 extends between OLM 168 and each resistor $172_1$, $172_2$, $172_3$, $172_4$. OLM 168 can include a microprocessor 200 which can selectively route electrical current through each resistor 172. OLM 168 can route electrical current through each resistor 172 independently of the other resistors 172. OLM 168 can route electrical current through a single resistor 172 or simultaneously through multiple resistors 172. OLM 168 can switch which resistors 172 are receiving current and can route electrical current to groups of resistors 172 along with changing which resistors 172 are in each group. The groups can contain one or more resistors 172. In the embodiment shown, OLM 168 includes a plurality of field effect transistors (FET) $202_1$, $202_2$, $202_3$, $202_4$ which facilitate the selective routing of electric current through an associated resistor $172_1$, $172_2$, $172_3$, $172_4$.

OLM 168 can monitor the health of each resistor 172 by determining the impedance of the resistor 172. The impedance can be determined by OLM 168 measuring the current flow through the resistor 172 and the voltage across the resistor 172. OLM 168 can also monitor a temperature of resistor array 170 to ascertain a state of health of resistor array 170 and/or to limit the temperature of resistor array 170. A temperature sensor 197 can be included in resistor array 170 and be electrically coupled to OLM 168 with electrical lines 204, 206. Temperature sensor 197 can provide a signal to OLM 168 indicative of the temperature of resistor array 170.

Based on the state of health of resistor array 170 and/or individual resistors 172, OLM 168 can remove bad resistor(s) 172 and/or resistor array 170 from service by not routing electrical current therethrough. Additionally, OLM 168 can provide a warning signal when one or more of the resistors 172 and/or resistor array 170 can no longer be used. The warning signal can be communicated to main control module 124 through electrical lines 208, 210, 212 coupled to controller area network 126. In some embodiments, the warning signal can result in a change in the operation of turf maintenance vehicle 10. For example, when one or more resistors 172 and/or resistor array 170 cannot be used to dissipate the excess regeneration energy, operation of turf maintenance vehicle 10 can be terminated, limited to lower speeds (e.g., speeds below a threshold value), and/or prevent operation of cutting units 18, 20, 22. The lower speeds can reduce the amount of excess regeneration energy thereby reducing the potential for damage to electrical system 120 and turf maintenance vehicle 10.

OLM 168 monitors the voltage level of power bus 58 and based on that voltage level and the SOC of rechargeable power source 75, 75' will selectively route the regeneration energy to resistor array 170. When OLM 168 determines that excess regeneration energy exists, OLM 168 will route the excess regeneration energy into one or more resistors 172. The number of resistors 172 utilized will vary based on the amount of excess regeneration energy to be dissipated. Additionally, which resistors 172 are utilized can also vary based on their state of health and previous loading/usage, and other criteria by way of non-limiting example. If the voltage level of power bus 58 exceeds the ability of resistor array 170 to dissipate the excess regeneration energy, OLM 168 can initiate a shutdown to protect electrical system 120.

In some embodiments, the number of resistors 172 utilized is based on a comparison of the voltage $V_p$ of power bus 58 with various increasing threshold values. For example, when $V_p$ is greater than a first threshold value, a single resistor 172 is utilized, when $V_p$ is greater than a second threshold value, two resistors 172 will be simultaneously utilized, when $V_p$ is greater than a third threshold value, three resistors 172 will be simultaneously utilized, and when $V_p$ is greater than a fourth threshold value, four resistors 172 will be simultaneously utilized, and so on. The number of different threshold values, the specific magnitude of the threshold values, and the number of resistors simultaneously utilized can vary to meet the operational demands and design of turf maintenance vehicle 10. Additionally, the number of resistors 172 that can be simultaneously utilized can be limited by the number resistors 172 in resistor array 170 and/or the number of healthy resistors 172.

In some embodiments, OLM 168 dynamically switches which resistors 172 are used during the dissipation of the excess regeneration energy to spread the loading across all of the healthy resistors 172. When OLM 168 determines that only a single resistor 172 is required be used to dissipate the excess regeneration energy, OLM 168 can utilize all of the resistors $172_1$, $172_2$, $172_3$, $172_4$ by switching between which resistor $172_1$, $172_2$, $172_3$, $172_4$ receives the electrical current. OLM 168 can cycle through each resistor $172_1$, $172_2$, $172_3$, $172_4$ with each resistor $172_1$, $172_2$, $172_3$, $172_4$ receiving the electrical current for a predetermined period of time.

When OLM 168 determines that two resistors 172 are required to be simultaneously utilized to dissipate the excess regeneration energy, OLM 168 can utilize all of the resistors $172_1$, $172_2$, $172_3$, $172_4$ by selectively routing electrical current simultaneously through any two of the resistors $172_1$, $172_2$, $172_3$, $172_4$ and switching which two resistors $172_1$, $172_2$, $172_3$, $172_4$ receive the electrical current during the period of excess regeneration energy. OLM 168 can switch which resistors $172_1$, $172_2$, $172_3$, $172_4$ receive the electrical current to achieve a desired operation. By way of non-limiting example, the switching can be done so that each individual resistor 172 is utilized twice in a row or so that no individual resistor 172 is utilized twice in a row.

When OLM 168 determines that three resistors 172 are required to be simultaneously utilized to dissipate the excess regeneration energy, OLM 168 can utilize all of the resistors $172_1$, $172_2$, $172_3$, $172_4$ by selectively routing electrical current simultaneously through any three of the resistors $172_1$, $172_2$, $172_3$, $172_4$ and switching which three resistors $172_1$, $172_2$, $172_3$, $172_4$ receive the electrical current during the period of excess regeneration energy. OLM 168 can switch which resistors $172_1$, $172_2$, $172_3$, $172_4$ receive the electrical current to achieve a desired operation.

The switching possibilities can vary based on the number of resistors 172 in resistor array 170, the state of health of each resistor 172 and the number of resistors 172 required to be simultaneously utilized. When the number of resistors 172 required to be simultaneously utilized is equal to all of the available resistors 172, switching resistors cannot be accomplished. It should be appreciated that the number of resistors 172 required to be simultaneously utilized can vary during an excess regeneration energy condition. Thus, OLM 168 can change the number of resistors 172 being simultaneously utilized and the method of switching during an excess regeneration energy condition. Furthermore, the cycling of which resistors 172 are used at any one time to dissipate the excess regeneration energy can continue until the excess regeneration energy condition is over.

The time period of operation of any individual resistor 172 or group of resistors 172 can vary. In some embodiments, the switching can occur such that each resistor 172 only receives electrical current for a small period of time. By way of non-limiting example, the period of time can be less than a second. The rate at which OLM 168 switches between which resistors 172 are utilized can help spread out the loading and reduce the possibility of any particular resistor 172 receiving an excessive or damaging load. The switching can improve the useful life of each resistor 172 and of resistor array 170. The switching capability also allows OLM 168 to remove resistors 172 that are not healthy from service without necessarily shutting down operation of regeneration energy shunt system 166.

OLM 168 can be programmed to perform different dissipation scenarios to meet the needs of the turf maintenance vehicle 10 in which regeneration energy shunt system 166 is utilized. The ability of OLM 168 to monitor the state of health of resistors 172 advantageously allows that information to be relayed to main control module 124 for diagnostics and possibly relayed to the operator of turf maintenance vehicle 10. Additionally, the state of health information can be used to reduce and/or terminate operation of turf maintenance vehicle 10 to protect against an over-voltage condition. The longevity and performance of turf maintenance vehicle 10 can thereby be enhanced.

Figure 7:
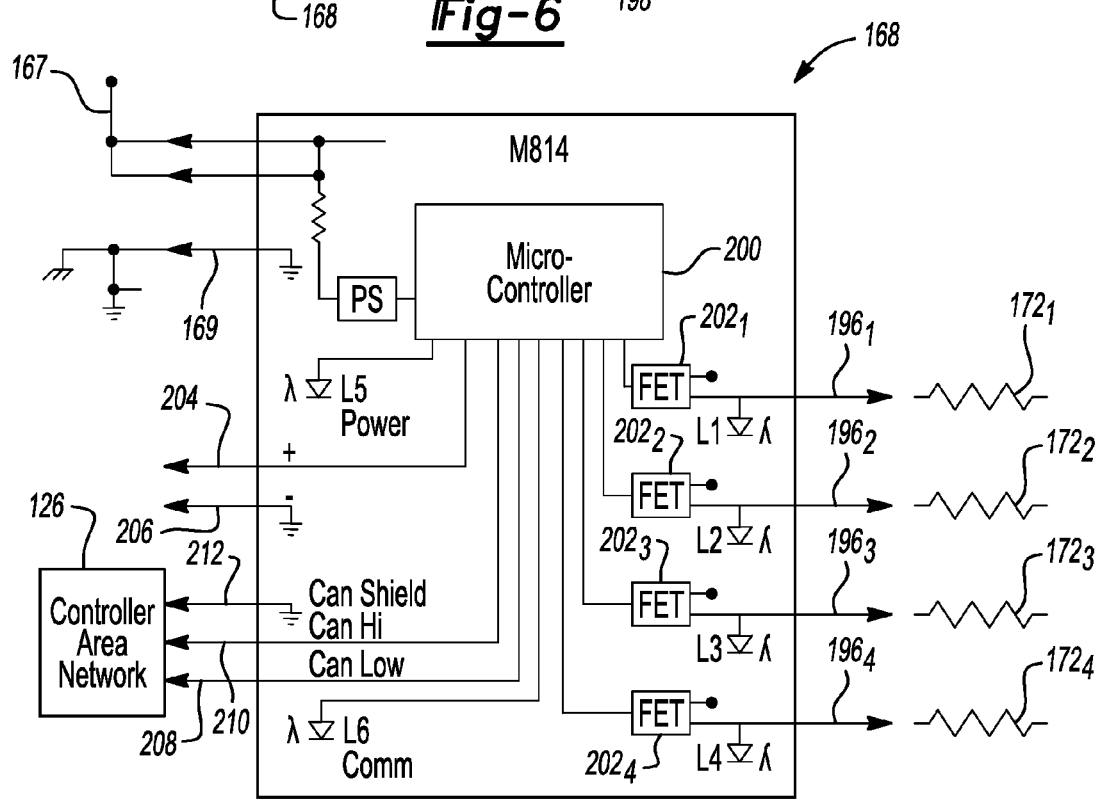
FIG. 7 is a schematic of an exemplary overvoltage limiter module according to the present teachings.
Figure 8:
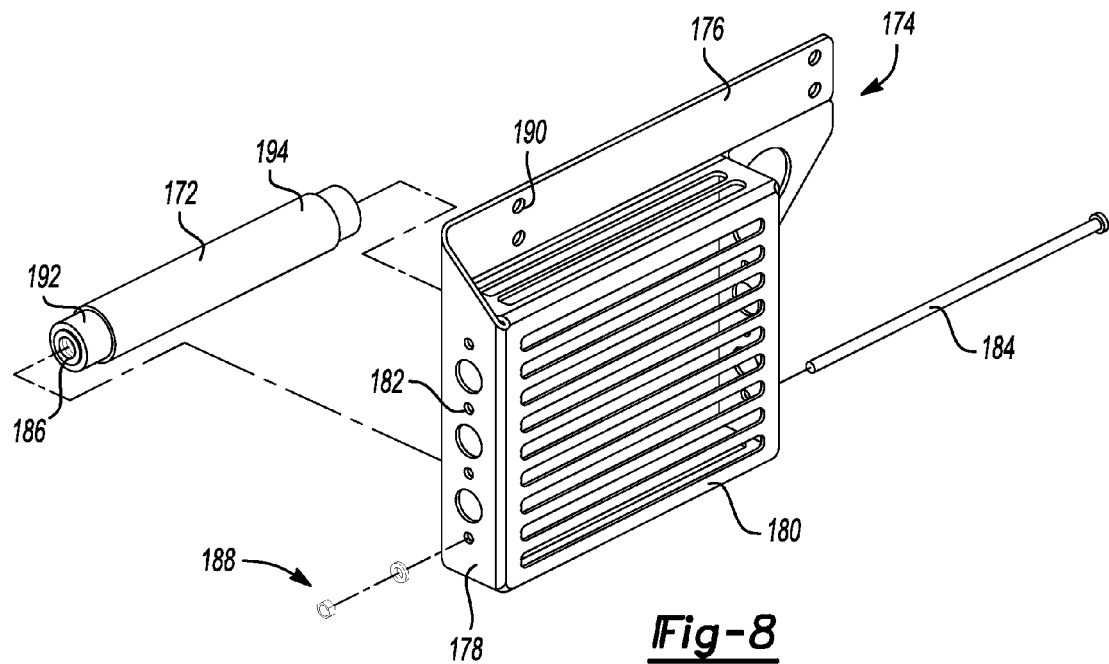
FIG. 8 is an exploded assembly view of the resistor array according to the present teachings.
Figure 9:
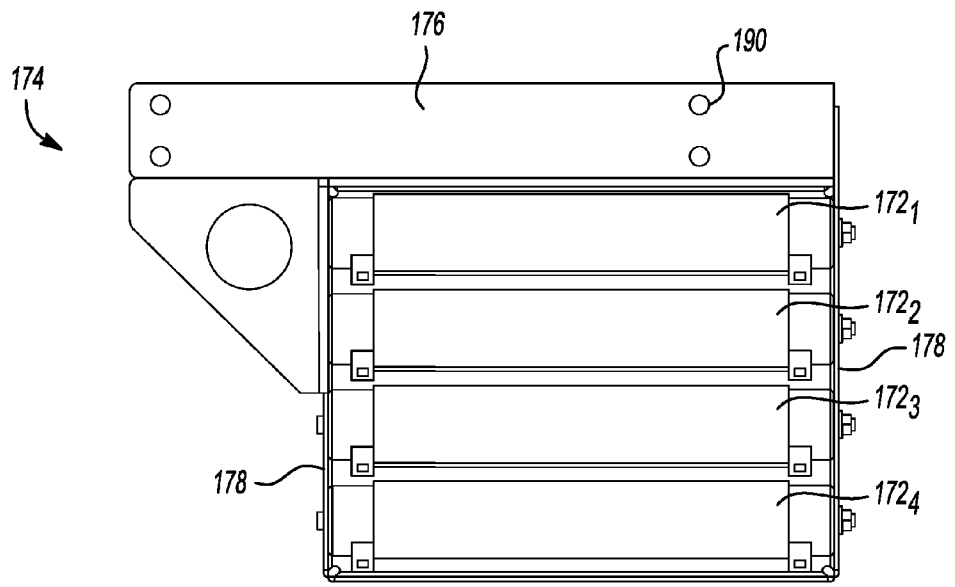
FIG. 9 is a rear plan view of the assembled resistor array of FIG. 8.
Figure 10:
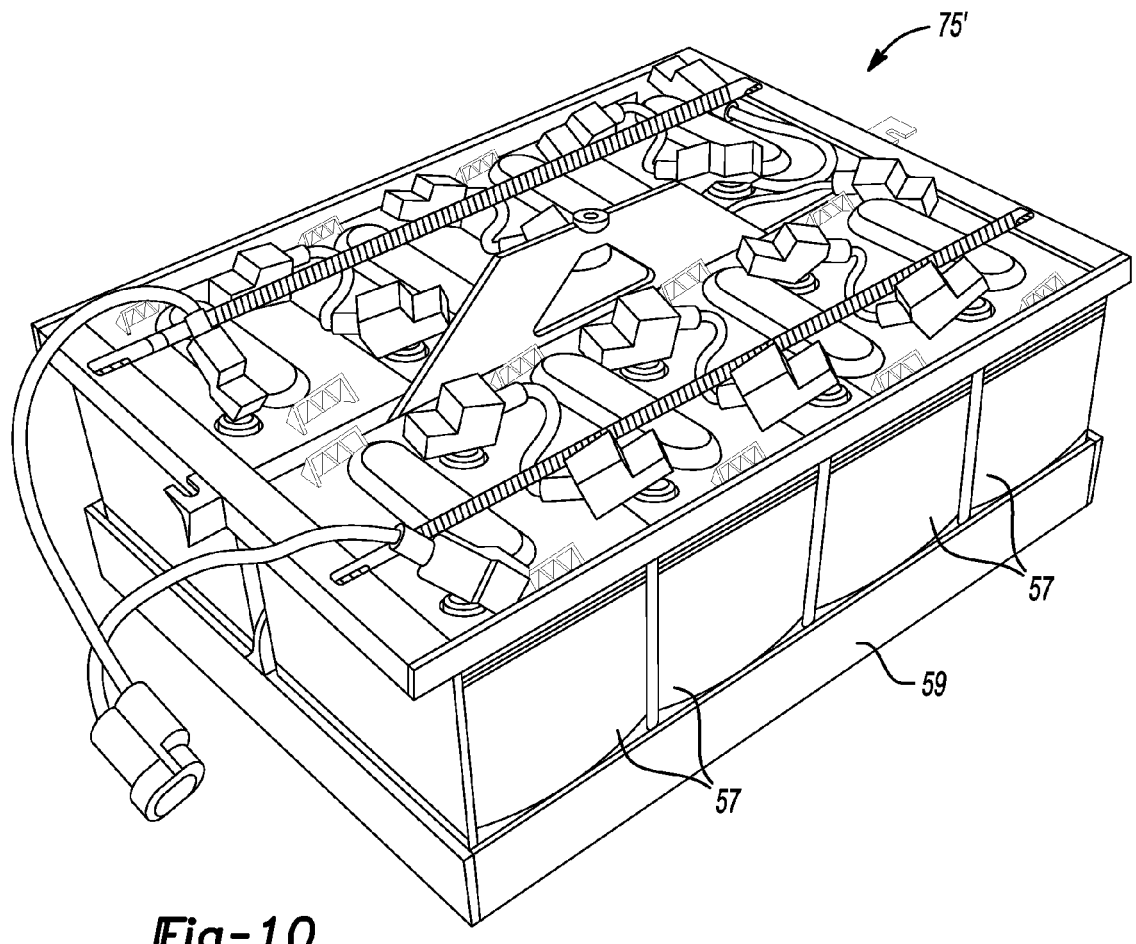
FIG. 10 is a perspective view of a power unit including a plurality of batteries that form a rechargeable power source useable in the turf maintenance vehicle of FIG. 1.

It should be appreciated that while turf maintenance vehicle 10 and regeneration energy shunt system 160 disclosed herein are shown with reference to specific examples and configurations, variations in the turf maintenance vehicle 10 and regeneration energy shunt system 160 can be employed without departing from the spirit and scope of the present teachings. For example, while turf maintenance vehicle 10 is shown as being a particular configuration of a riding turf maintenance vehicle, the present teachings are also applicable to other riding turf maintenance vehicles, walk behind turf maintenance vehicles, standing turf vehicle maintenance vehicles, and the like that employ regenerative braking. As another example, it should be appreciated that the specific configuration and components of regeneration energy shunt system 160 used herein can be configured in different arrangements and with different components to provide the desired functionality. The details of OLM 168 shown in FIG. 7 are merely representative of one possible configuration for an OLM 168 having the described functionality. Additionally, the type, number and size of the resistors utilized in resistor array 170 can also vary from those shown and described. Moreover, the details of the various modules described herein are merely exemplary and do not represent all the modules that can be utilized in turf maintenance vehicle 10 or all of their functionality. Thus, one skilled in the art will readily recognize from such teachings and from the accompanying drawings and claims that various changes, modifications, and variations can be made therein without departing from the spirit and scope of the present teachings.

What is claimed is:

1. A braking regeneration energy shunt system for a turf maintenance vehicle comprising:
   a power bus;
   a traction motor coupled to the power bus, the traction motor developing a back electromotive force that can be directed into the power bus as regeneration energy;
   a rechargeable power source coupled to the power bus, the rechargeable power source selectively providing electric current to the power bus and selectively receiving electric current from the power bus;
   a resistor array having a plurality of resistors, the resistor array selectively dissipating regeneration energy into heat; and
   a control module monitoring a voltage of the power bus and a state of charge of the rechargeable power source, the control module selectively directing regeneration energy created by the traction motor into the resistor array for dissipation as heat based on both the voltage of the power bus and the state of charge of the rechargeable power source,
   wherein the control module ascertains a number of the resistors needed to dissipate the regeneration energy directed to the resistor array and directs the regeneration energy simultaneously to the ascertained number of resistors, wherein the control module ascertains a state of health of the resistors and selectively directs the regeneration energy only to one or more of the resistors that are ascertained as healthy.

2. The system of claim 1, wherein the control module determines an impedance of each of the resistors and ascertains the state of health of each of the resistors based on the impedance.

3. The system of claim 1, wherein the control module signals when the state of health of a resistor is below a predetermined value.

4. The system of claim 1, wherein the resistor array includes a temperature sensor sending a signal to the control module indicative of a temperature of the resistor array and the control module monitors the temperature of the resistor array and prevents the regeneration energy from being directed to the resistor array when the temperature exceeds a threshold value.

5. The system of claim 1, wherein the control modules ascertains the number or resistors needed based on the voltage of the power bus.

6. The system of claim 5, wherein the control module increases the number of resistors simultaneously being directed the regeneration energy as the voltage of the power bus increases.

7. The system of claim 1, wherein the control module compares the voltage of the power bus to a plurality of predetermined values and changes the number of resistors simultaneously being directed the regeneration energy based on the comparison.

8. The system of claim 1, wherein when the ascertained number of resistors is less than a total number of resistors, the control module distributes loading of the regeneration energy over all of the resistors by actively switching which resistors are directed the regeneration energy as the regeneration energy is being dissipated.

9. The system of claim 1, wherein when the rechargeable power source is fully charged, the control module directs the regeneration energy to the resistor array.

10. A turf maintenance vehicle comprising:
a rechargeable power source;
a power bus coupled to the rechargeable power source and receiving electrical energy therefrom; at least one driven wheel;
at least one electric motor coupled to the power bus and operable to drive the at least one driven wheel, the at least one electric motor creating regeneration energy during deceleration, the regeneration energy operable to at least partially recharge the rechargeable power source;
a resistor array having a plurality of resistors, the resistor array selectively dissipating regeneration energy directed thereto into heat; and
a control module monitoring at least one of a voltage of the power bus and a state of charge of the rechargeable power source, the control module selectively directing the regeneration energy created by the at least one motor into the resistor array for dissipation as heat based on at least one of the voltage of the power bus and the state of charge of the rechargeable power source,
wherein the control module ascertains the number of resistors needed to dissipate the regeneration energy directed to the resistor array and directs the regeneration energy simultaneously to the ascertained number of resistors, wherein the control module ascertains a state of health of the resistors and selectively directs the regeneration energy only to one or more of the resistors that are ascertained as healthy.

11. The turf maintenance vehicle of claim 10, wherein the control module determines an impedance of each of the resistors and ascertains the state of health of each of the resistors based on the impedance.

12. The turf maintenance vehicle of claim 10, wherein the control module signals when the state of health of a resistor is below a predetermined value.

13. The turf maintenance vehicle of claim 10, wherein the resistor array includes a temperature sensor sending a signal to the control module indicative of a temperature of the resistor array and the control modules monitors the temperature of the resistor array and prevents the regeneration energy from being directed to the resistor array when the temperature exceeds a threshold value.

14. The turf maintenance vehicle of claim 10, wherein the control modules ascertains the number or resistors needed based on the voltage of the power bus.

15. The turf maintenance vehicle of claim 14, wherein the control module increases the number of resistors simultaneously being directed the regeneration energy as the voltage of the power bus increases.

16. The turf maintenance vehicle of claim 10, wherein the control module compares the voltage of the power bus to a plurality of predetermined values and changes the number of resistors simultaneously being directed the regeneration energy based on the comparison.

17. The turf maintenance vehicle of claim 10, wherein when the ascertained number of resistors is less than a total number of resistors, the control module distributes loading of the regeneration energy over all of the resistors by actively switching which resistors are directed the regeneration energy as the regeneration energy is being dissipated.

18. The turf maintenance vehicle of claim 10, wherein when the rechargeable power source is fully charged, the control module directs the regeneration energy to the resistor array.

19. The turf maintenance vehicle of claim 10, further comprising an engine and a generator operable to supply electrical power to the power bus, the engine and generator being a primary source of electrical power supplied to the power bus and wherein the rechargeable power source selectively supplements the primary source of electrical power based on load conditions.

20. The turf maintenance vehicle of claim 10, wherein the control module monitors both the voltage of the power bus and the state of charge of the rechargeable power source and selectively directs the regeneration energy into the resistor array based on both the voltage of the power bus and the state of charge of the rechargeable power source.

21. A method of dissipating regeneration energy created in a turf maintenance vehicle having a power bus, a rechargeable power source, and a resistor array having a plurality of resistors, the method comprising:
monitoring a voltage of the power bus;
monitoring a state of charge of the rechargeable power source;
creating regeneration energy during deceleration of the turf maintenance vehicle;
selectively routing the regeneration energy to the rechargeable power source when the state of charge is less than a predetermined value;

selectively routing the regeneration energy to the resistor array when the state of charge is greater than the predetermined value;

selectively routing the regeneration energy created to the resistor array further based on the voltage of the power bus;

dissipating the regeneration energy with at least two of the resistors in the resistor array when the regeneration energy is routed to the resistor array; and ascertaining a state of health of the resistors in the resistor array and wherein dissipating the regeneration energy includes dissipating the regeneration energy with only resistors ascertained as being healthy.

22. The method of claim 21, further comprising monitoring an impedance of each of the resistors and wherein ascertaining the state of health includes comparing the impedance of each of the resistors to a predetermined standard.

23. The method of claim 21, further comprising signaling when the state of health of a resistor is below a predetermined value.

24. The method of claim 21, further comprising:
ascertaining how many of the resistors are needed to be operated simultaneously to dissipate the regeneration energy; and
simultaneously dissipating the regeneration energy with the ascertained number of resistors.

25. The method of claim 24, wherein ascertaining the number of resistors needed to be operated simultaneously is based on the voltage of the power bus.

26. The method of claim 25, wherein ascertaining the number of resistors needed to be operated simultaneously includes comparing the voltage of the power bus to a plurality of predetermined values and further comprising changing the number of resistors simultaneously dissipating the regeneration energy based on the comparison.

27. The method of claim 24, wherein simultaneously dissipating the regeneration energy includes dynamically switching which resistors are dissipating the regeneration energy thereby distributing loading of the regeneration energy over more than the ascertained number of resistors.

28. The method of claim 27, wherein dynamically switching includes switching through all of the resistors in the array thereby distributing the load over all of the resistors in the array.

29. The method of claim 21, wherein selectively routing the regeneration energy to the resistor array includes routing the regeneration energy to the resistor array when the rechargeable power source is fully charged.

* * * * *